US008179061B1

(12) United States Patent
Liao

(10) Patent No.: US 8,179,061 B1
(45) Date of Patent: May 15, 2012

(54) BATTERY SYSTEM

(76) Inventor: Zhiwei Liao, Markham (CA)

( * ) Notice: Subject to any disclaimer, the term of this patent is extended or adjusted under 35 U.S.C. 154(b) by 252 days.

(21) Appl. No.: 12/726,682

(22) Filed: Mar. 18, 2010

(51) Int. Cl.
*G05D 1/02* (2006.01)

(52) U.S. Cl. ........... 318/16; 318/264; 318/280; 318/484

(58) Field of Classification Search .................... 318/16, 318/264, 265, 266, 280, 286, 466, 484; 49/25, 49/29, 30
See application file for complete search history.

(56) References Cited

U.S. PATENT DOCUMENTS

| | | | | |
|---|---|---|---|---|
| 4,009,051 | A | 2/1977 | Kazis et al. | |
| 4,636,579 | A | 1/1987 | Hanak et al. | |
| 5,372,173 | A | 12/1994 | Horner | |
| D395,279 | S | 6/1998 | Peress et al. | |
| 5,793,174 | A * | 8/1998 | Kovach et al. | 318/468 |
| 6,114,830 | A | 9/2000 | Luo | |
| 6,388,404 | B1 * | 5/2002 | Schnebly et al. | 318/16 |
| 6,680,594 | B2 * | 1/2004 | Collett et al. | 318/280 |
| 6,812,662 | B1 | 11/2004 | Walker | |
| 7,081,724 | B2 | 7/2006 | Bouix et al. | |
| 7,091,682 | B2 * | 8/2006 | Walker | 318/280 |
| 7,389,806 | B2 * | 6/2008 | Kates | 160/5 |
| 8,044,626 | B2 * | 10/2011 | Adamus et al. | 318/446 |
| 2004/0154757 | A1 | 8/2004 | Osinga | |
| 2007/0278989 | A1 | 12/2007 | Leboff | |

* cited by examiner

*Primary Examiner* — Walter Benson
*Assistant Examiner* — Thai Dinh

(57) ABSTRACT

The present invention features a battery system for saving power. In some embodiments, the battery system comprises a main control unit for processing commands. The main control unit may comprise a wireless transceiver for sending and receiving wireless commands, and a timer for waking a microcontroller from a low power state to check a status of the received signal. In some embodiments, the microcontroller configured to receive a signal from the wireless transceiver; and to generate a signal to the wireless transceiver. In some embodiments, the battery system further comprises a remote module for sending commands to the main control unit. The remote module may comprises a wireless transceiver for sending and receiving wireless commands, and a microcontroller for processing user inputs and sending the commands. In some embodiments, the microcontroller is configured to receive a signal from the wireless transceiver; and to generate a signal to the wireless transceiver.

4 Claims, 19 Drawing Sheets

MAIN CONTROL BOARD

REMOTE BOARD

BATTERY SYSTEM

FIELD OF THE INVENTION

The present invention is directed to an electronic system for powering devices such as a motorized window shade. More particularly, the present invention is directed at a unique power conservation unit where a rechargeable battery pack is wired to a photovoltaic panel for charging. The charging unit is capable of powering a device and being controlled by a remote. This unit will enter a low power state when not in use to conserve energy.

BACKGROUND OF THE INVENTION

One of the unique challenges when working with battery powered devices is the limited power available from the battery. This leads to the need for ever more efficient methods of using and conserving power. This unit, by entering a low power, energy saving state the majority of the time, is able to increase the length of time a device can operate on the same charge.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY

The present invention relates to a battery system for saving power. In some embodiments, the battery system comprises a main control. The main control comprises the following components: a central processing unit, a control unit, a timer and a receiver, the components are powered by a power source. The timer is operatively connected to the receiver, and the timer alternatively turns the receiver to an awake mode for a first time interval and to an sleep mode for a second time interval.

During the awake mode, the receiver is configured to receive a first signal, a second signal or a third signal; and during the sleep mode, the receiver does not receive the first, the second or the third signal. Upon receiving the first signal, second signal or third signal the receiver operatively communicates that signal to central processing unit. Upon receiving the first signal, second signal or third signal from the receiver, the central processing unit operatively communicates with the control unit. The control unit is operatively connected to a motor to activate the motor. Upon receiving the first signal the control unit instructs the motor to rotate clock-wise, upon receiving the second signal the control unit instructs the motor to rotate counter-clock-wise, upon receiving the third signal the control unit instructs the motor to stop rotating.

A power source operatively connects to the components of the main control to provide power thereto. The remote control comprises a transmitter. The transmitter is configured to transmit the first signal, the second signal or the third signal upon command. In some embodiments, the awake mode of the first time interval has a duration of about ten millisecond and the sleep mode of the second time interval has a duration of about four seconds. In some embodiments, the awake mode of the first time interval has a duration of about five to fifty millisecond. In some embodiments, the sleep mode of the second time interval has a duration of about one to ten seconds.

In some embodiments, the remote control is powered by a power source. The remote control may share the same power source as that of the main control or the remote control may have an independent power source.

DESCRIPTION OF PREFERRED EMBODIMENTS

Figure 1:
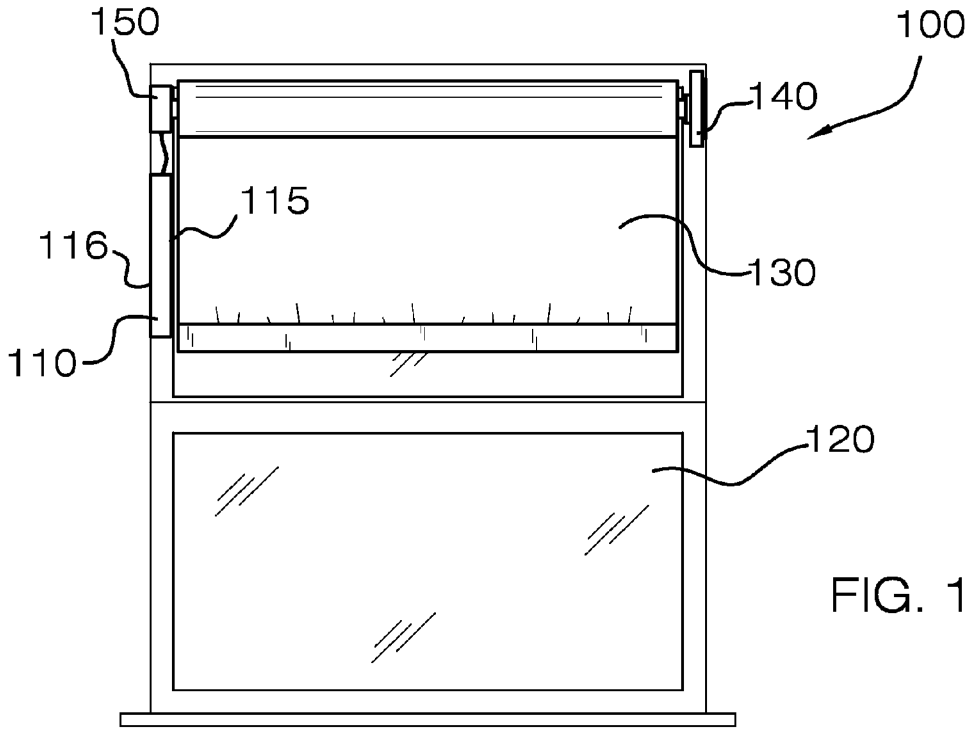
FIG. 1 is a front view of the battery system of the present invention as used with a window shade.
Figure 2:
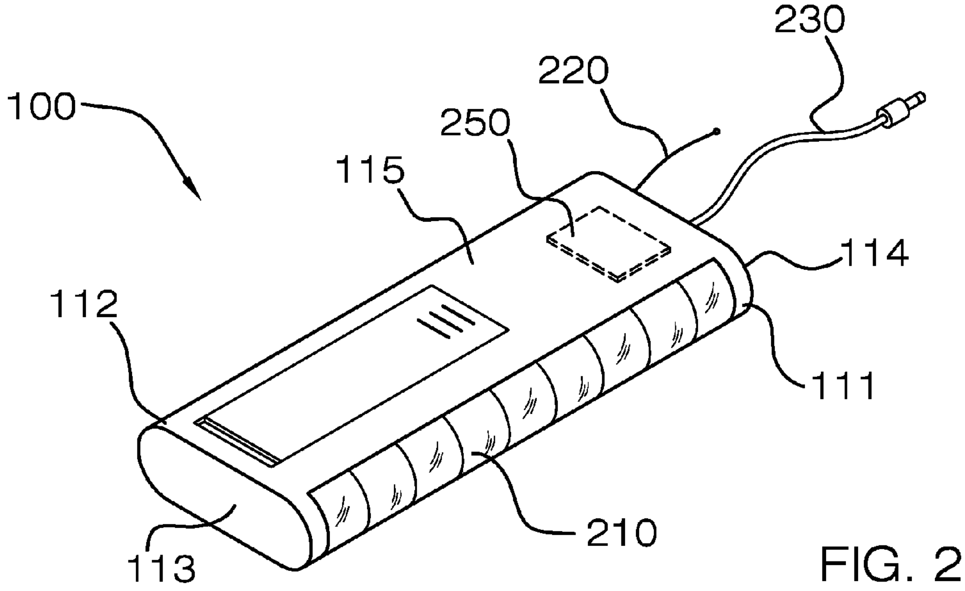
FIG. 2 is a perspective view of the battery system of the present invention.
Figure 3:
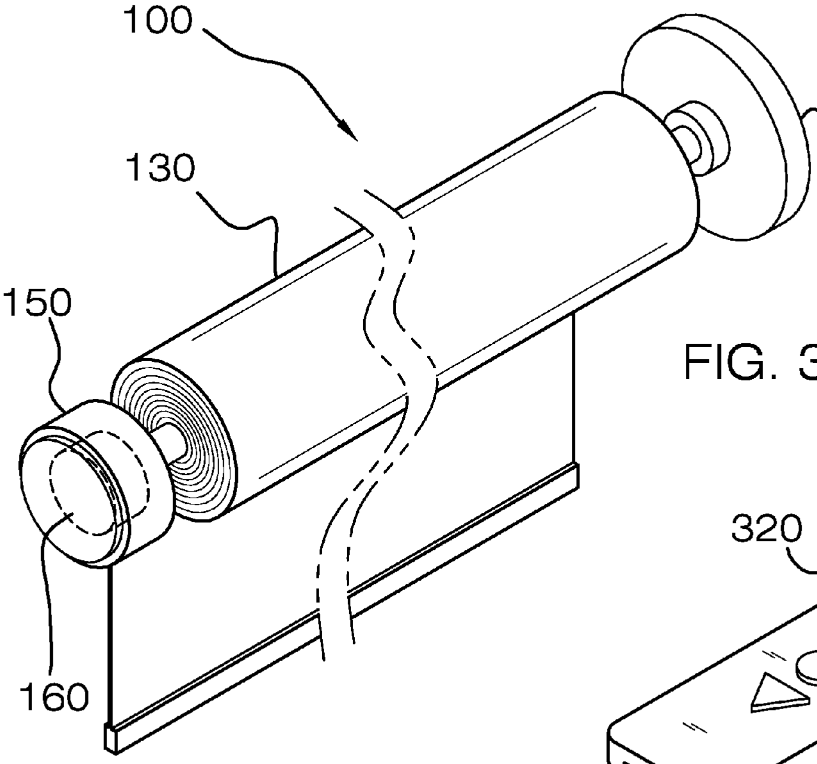
FIG. 3 is a perspective view of the battery system of the present invention.
Figure 4:
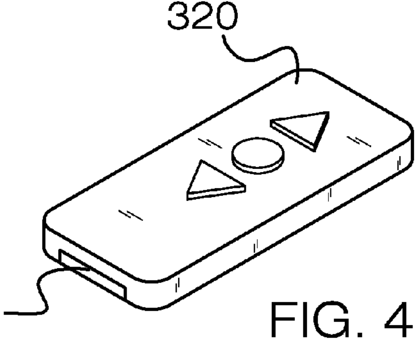
FIG. 4 is a perspective view of the remote control of the battery system of the present invention.
Figure 5:
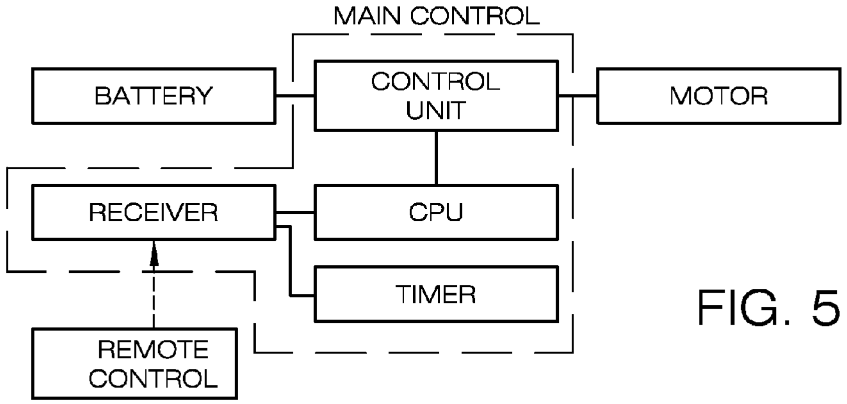
FIG. 5 is a schematic representation of the electrical components of the battery system of the present invention.
Figure 6:
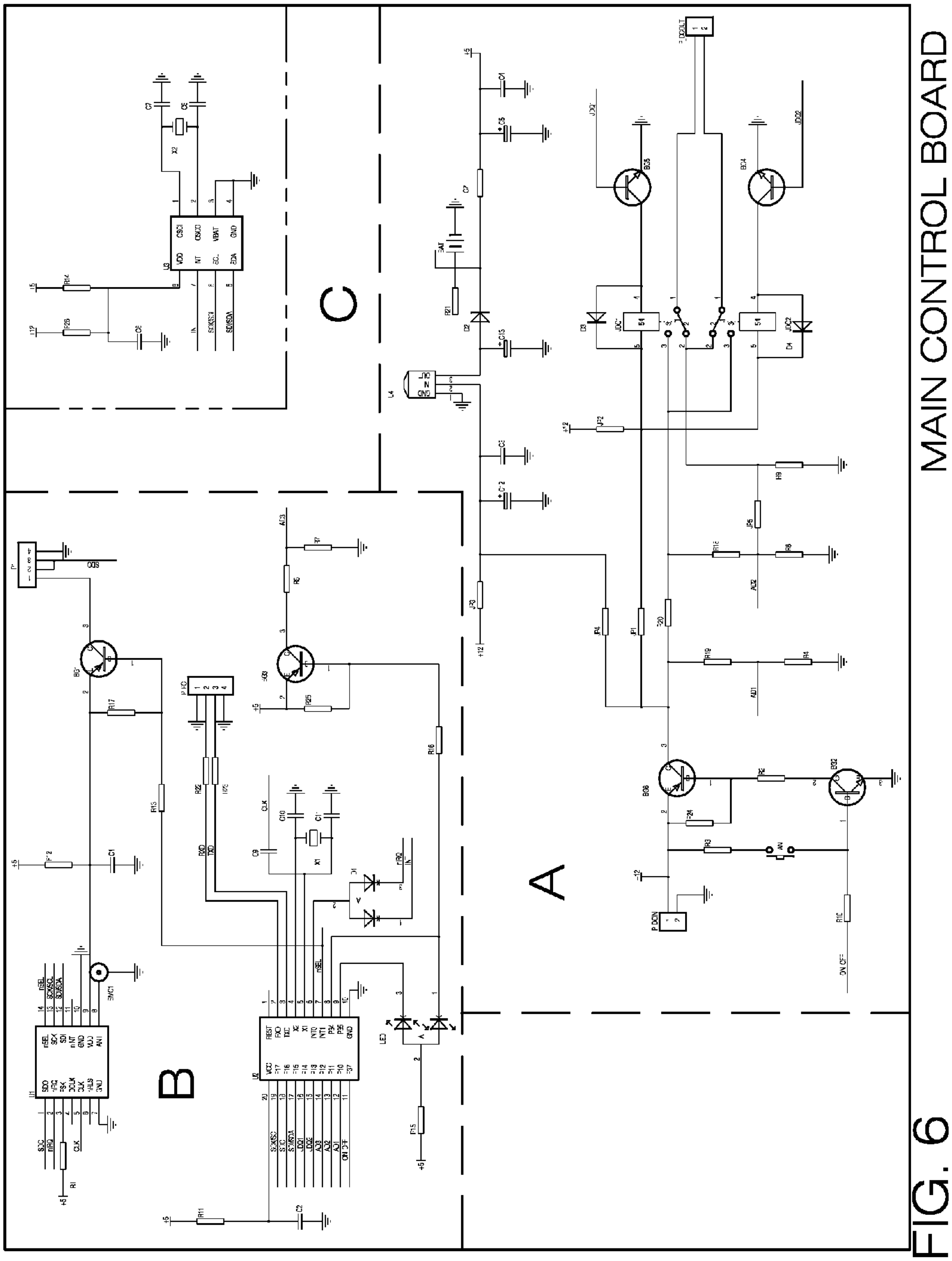
FIG. 6 is a schematic overview of the main control board. This is an overview, and the detailed portions are shown in FIG. 6*a*, FIG. 6*b* and FIG. 6*c*.
Figure 6A:
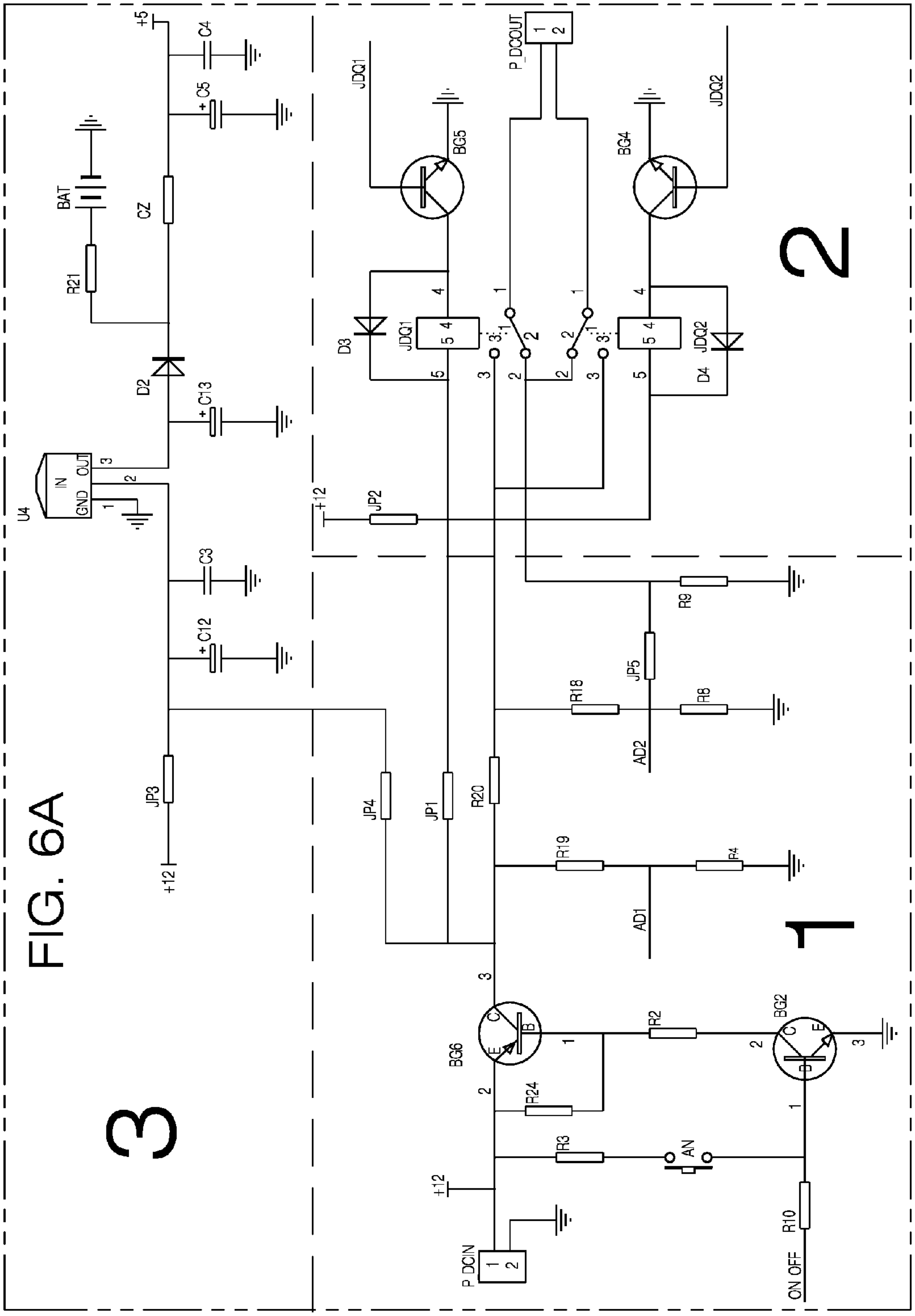
FIG. 6*a* is an exploded view of bottom portion FIG. 6.
Figures 1, 6A:
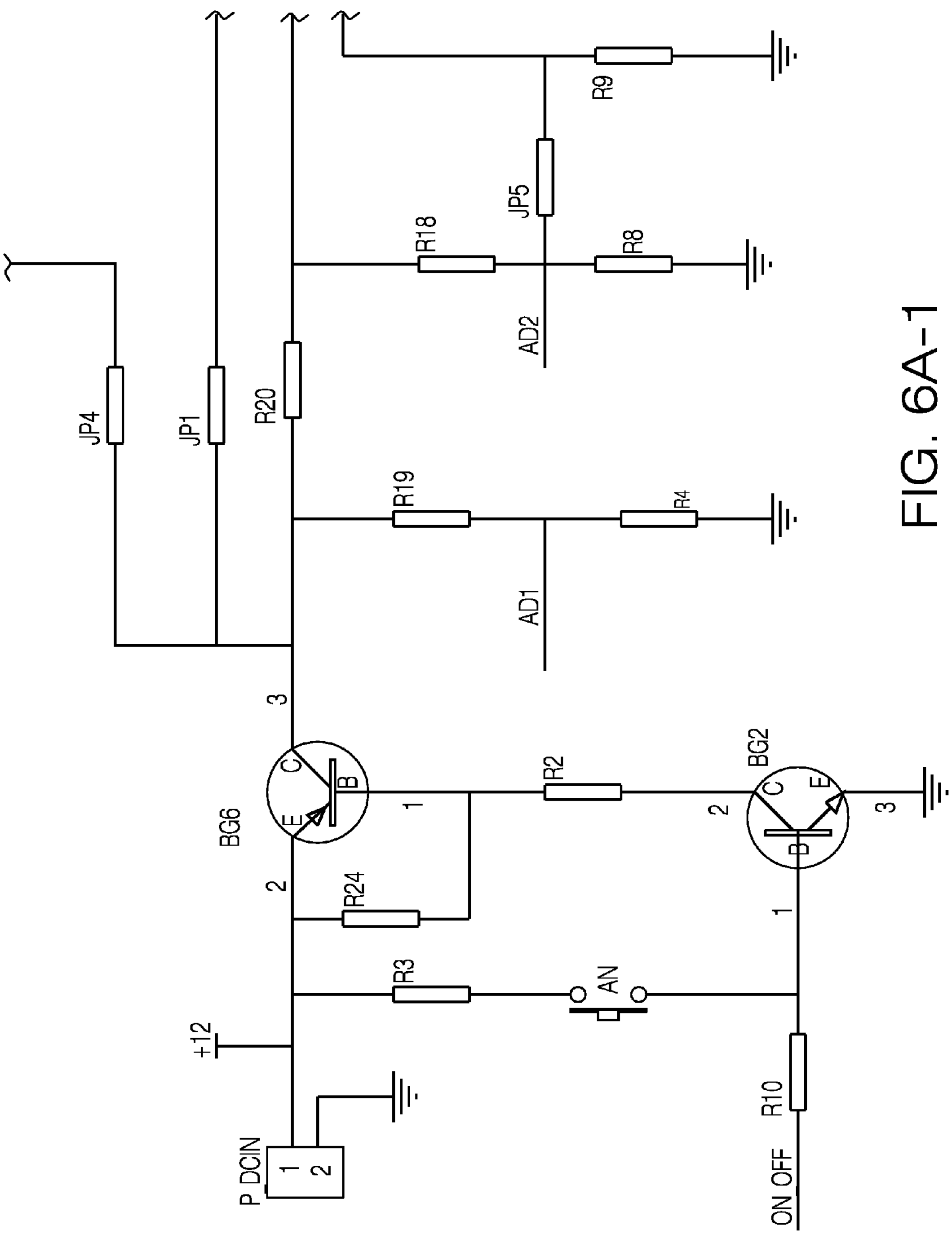
Figures 2, 6A:
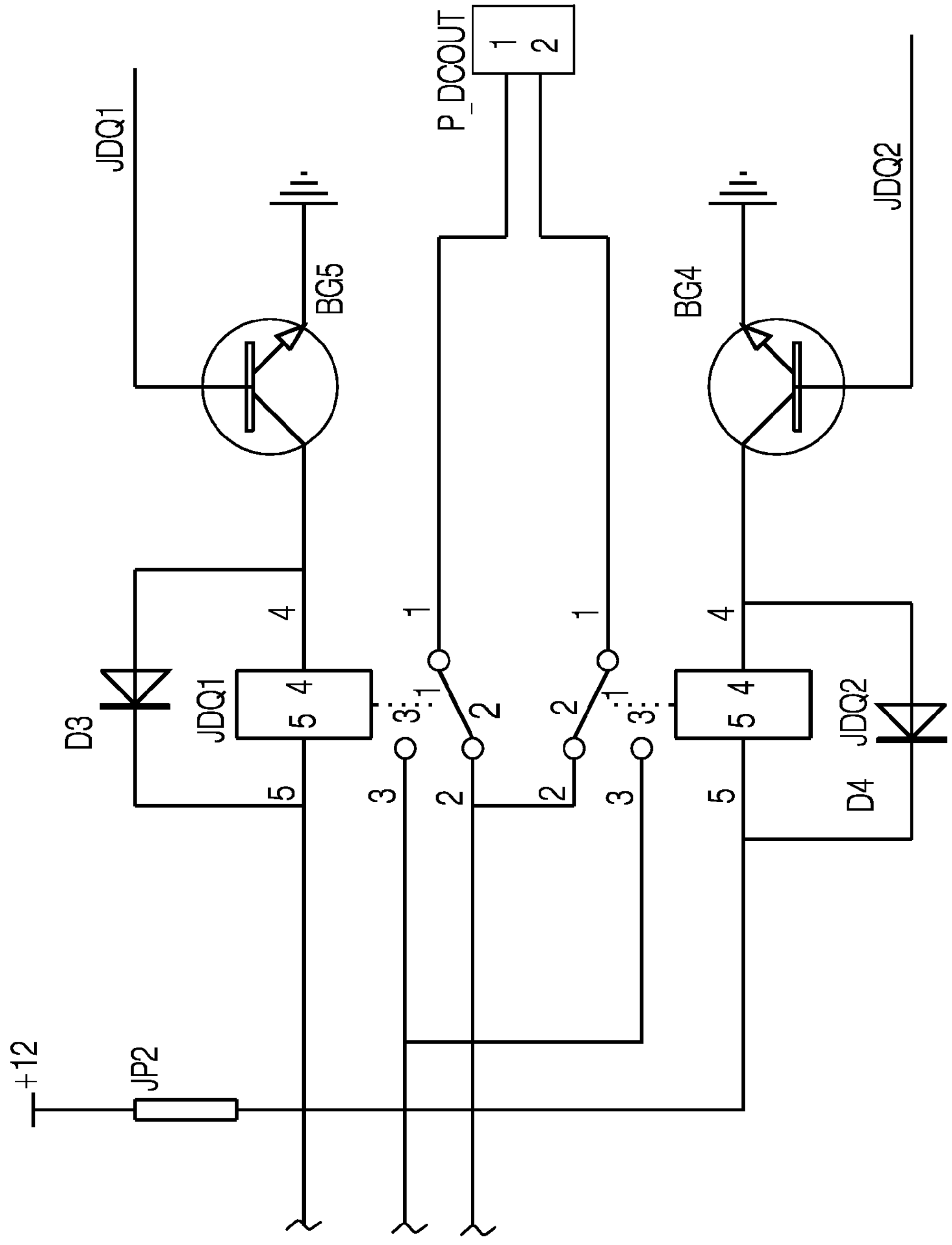
Figures 3, 6A:
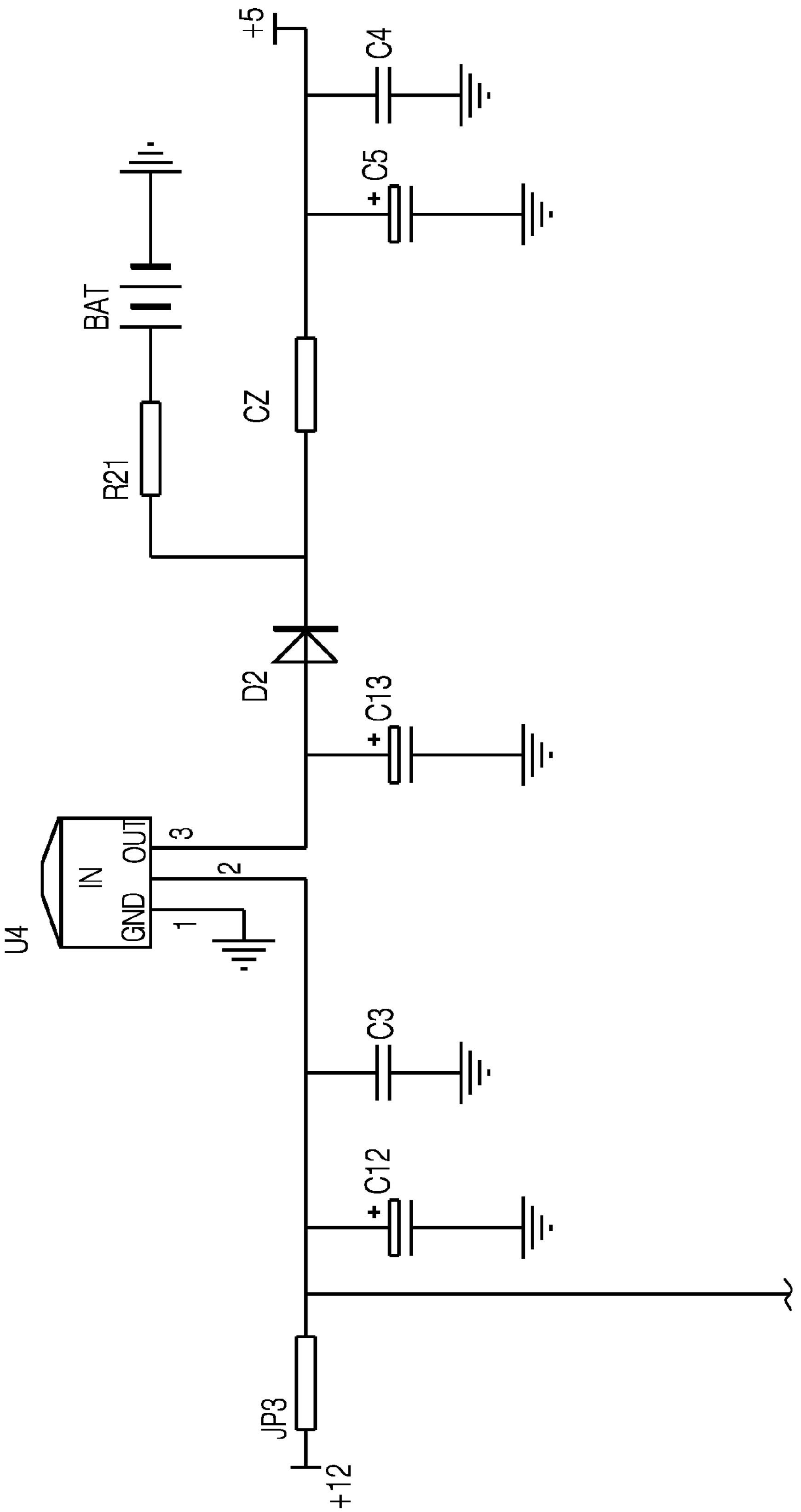
Figure 6B:
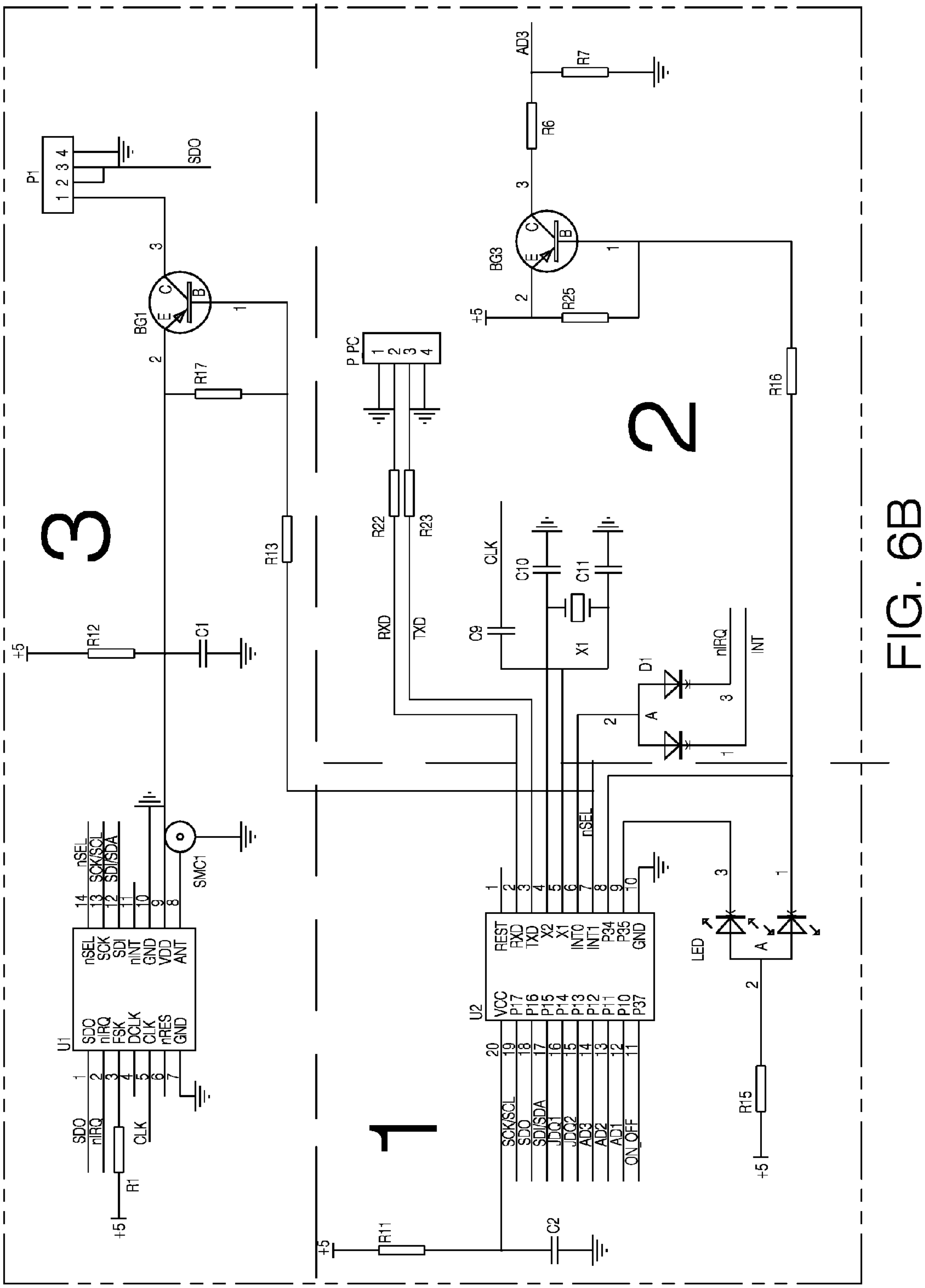
FIG. 6*b* is an exploded view of top left portion FIG. 6.
Figures 1, 6B:
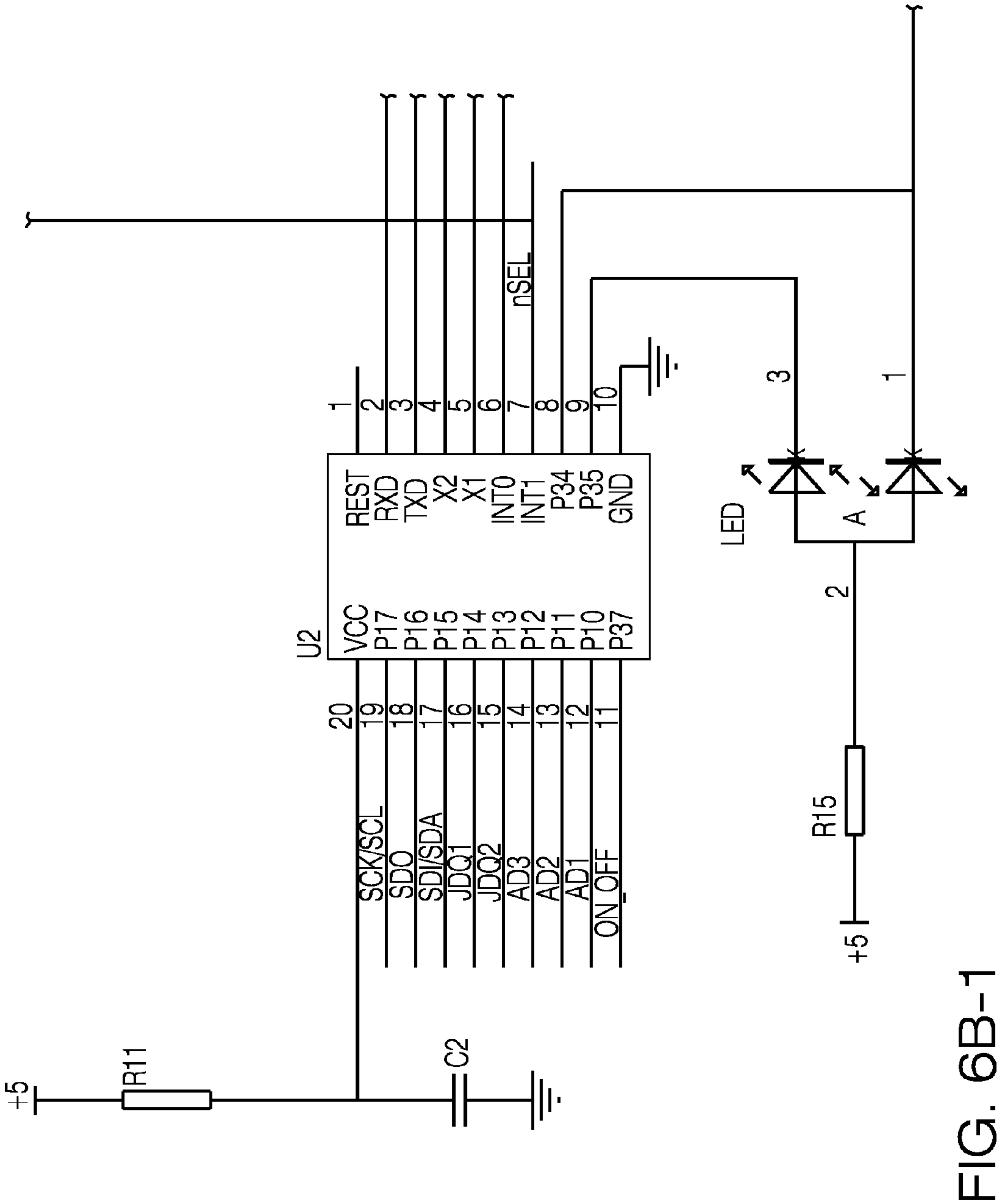
Figures 2, 6B:
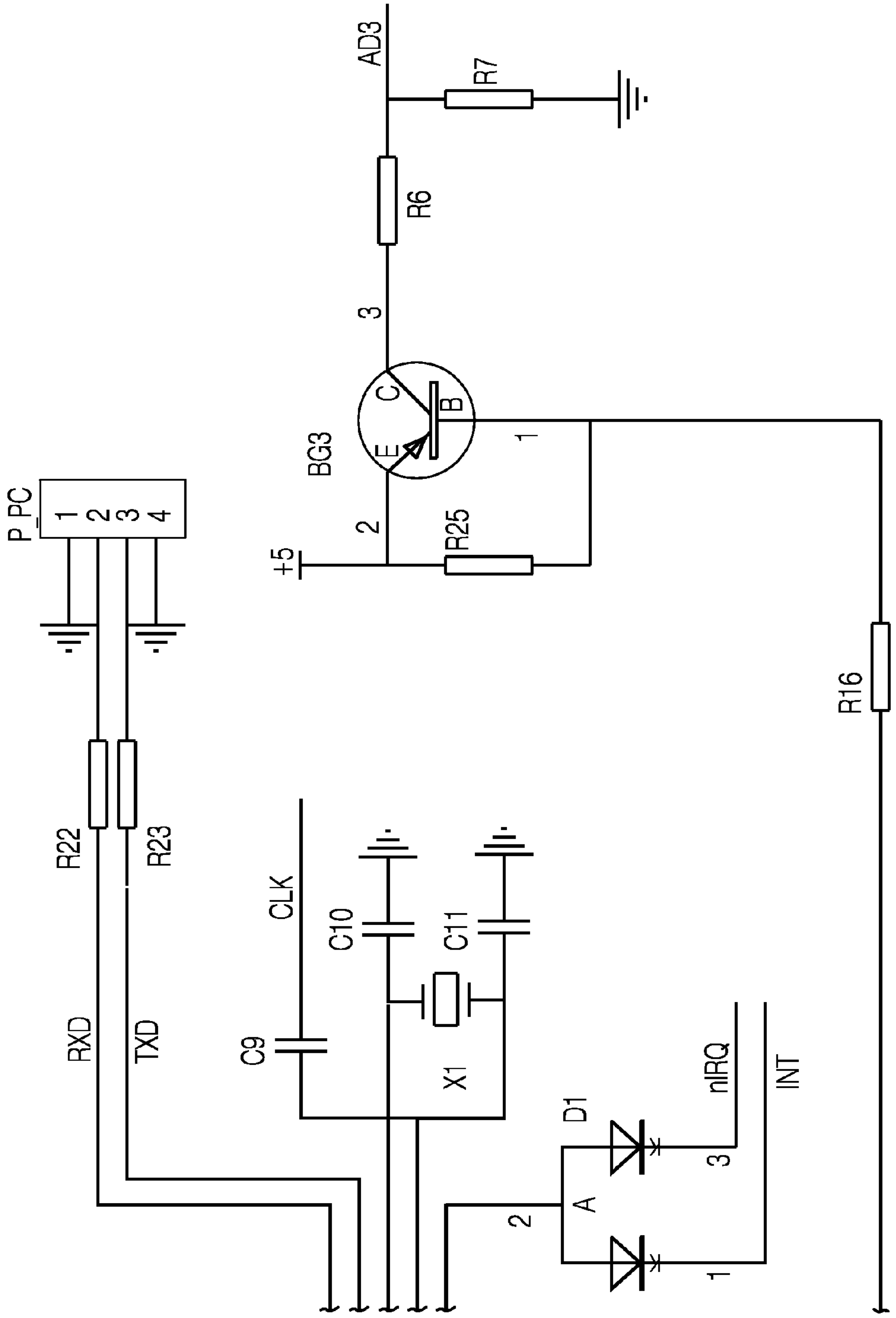
Figures 3, 6B:
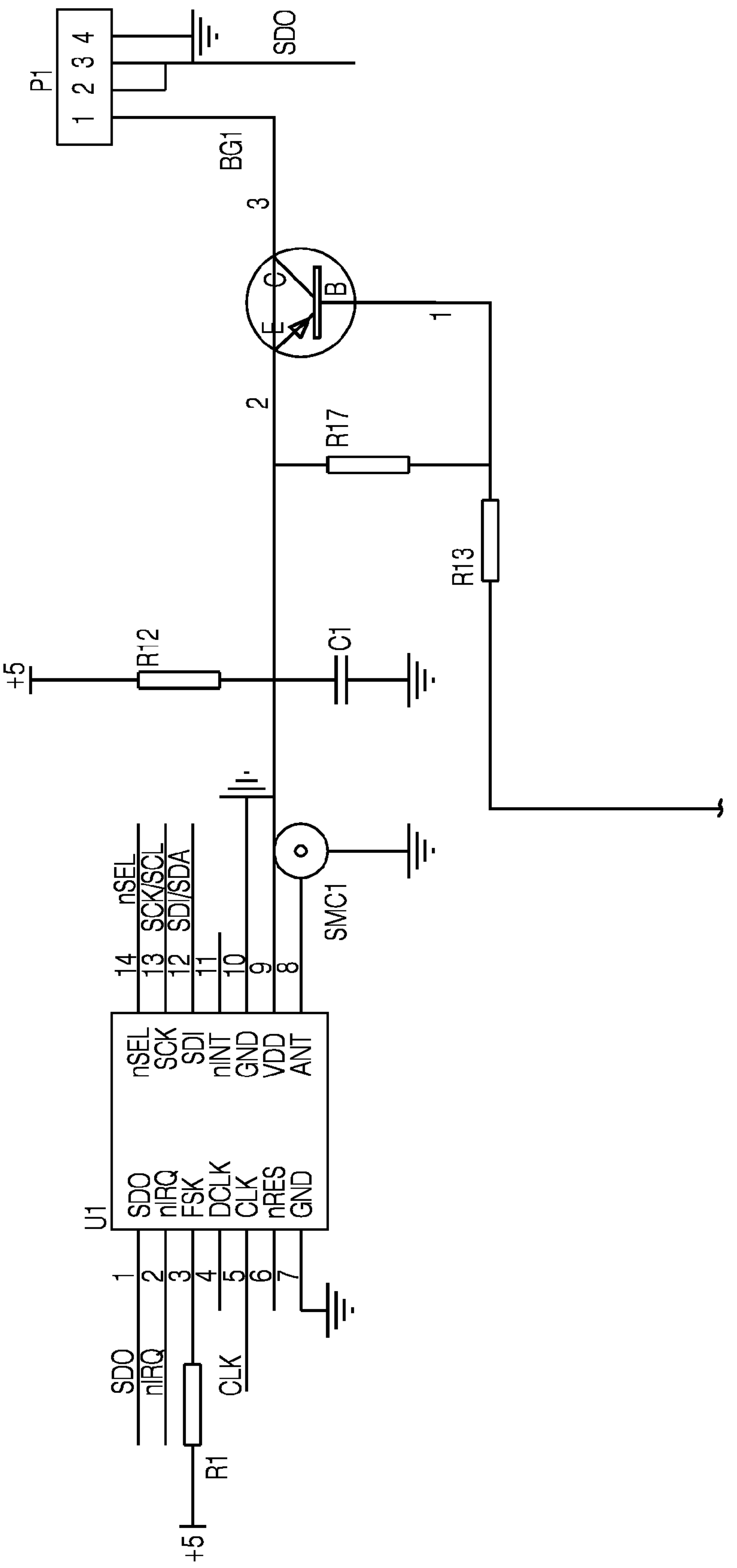
Figure 6C:
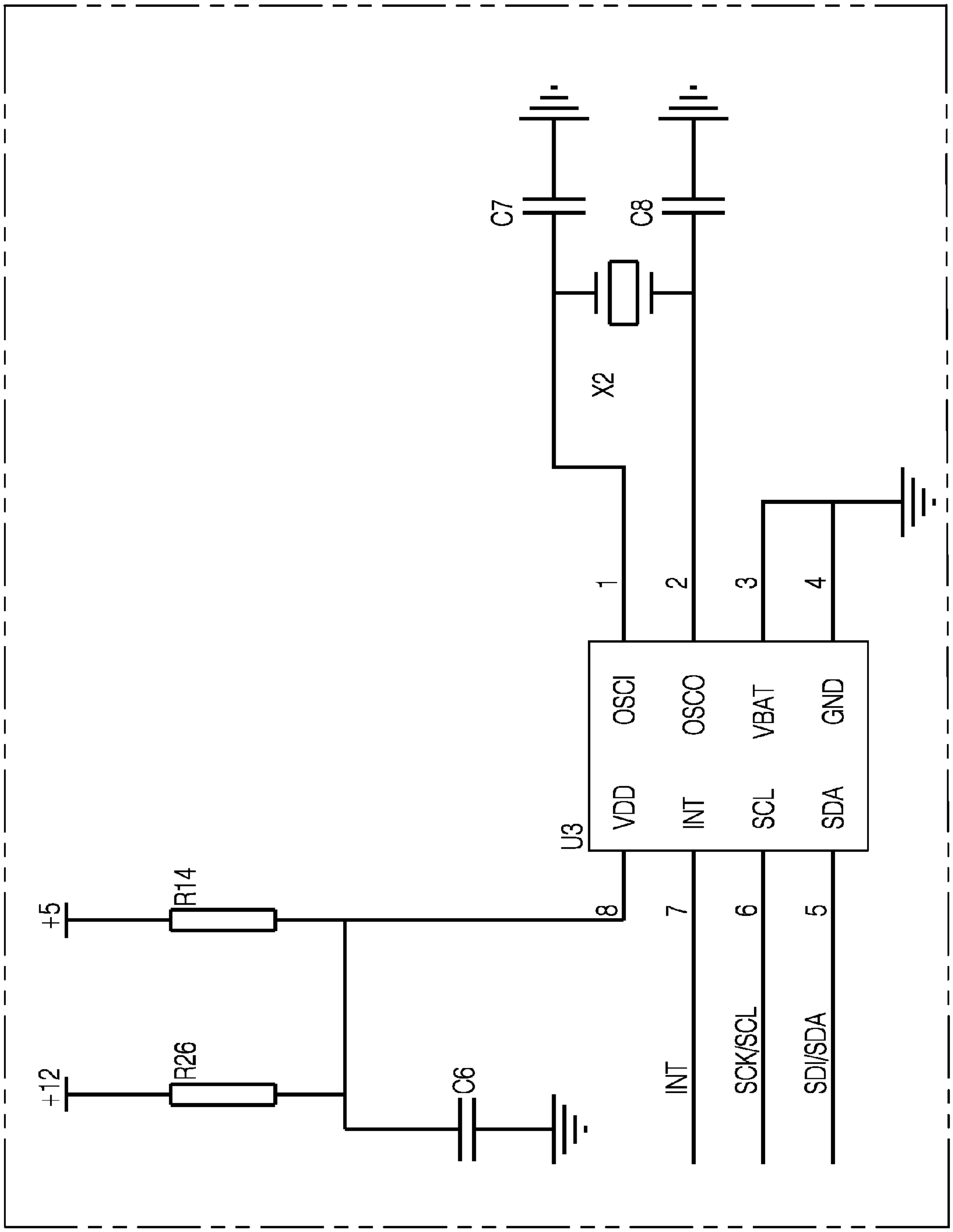
FIG. 6*c* is an exploded view of the top right portion of FIG. 6.
Figure 7:
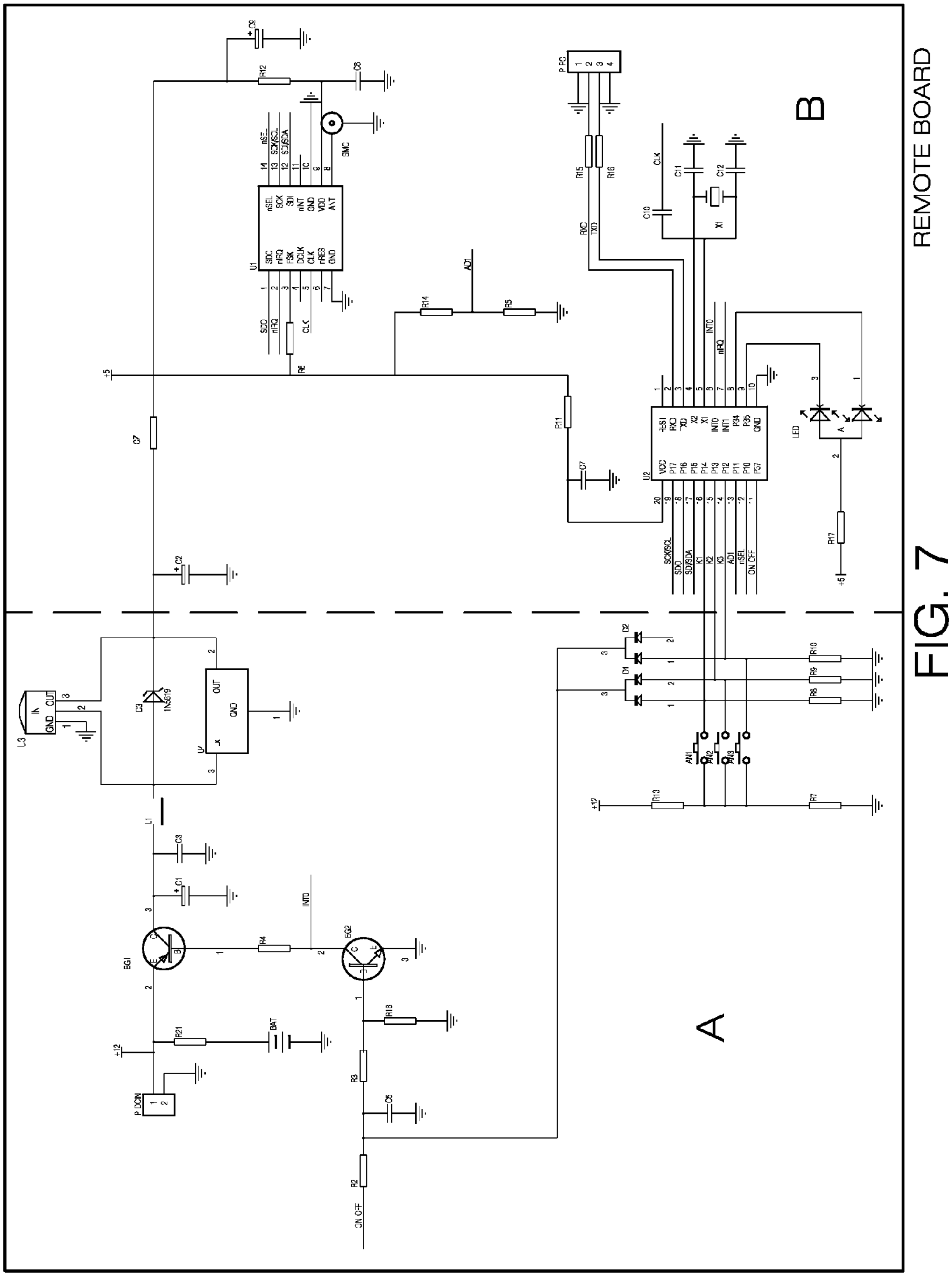
FIG. 7 is a schematic overview of the remote board.
Figure 7A:
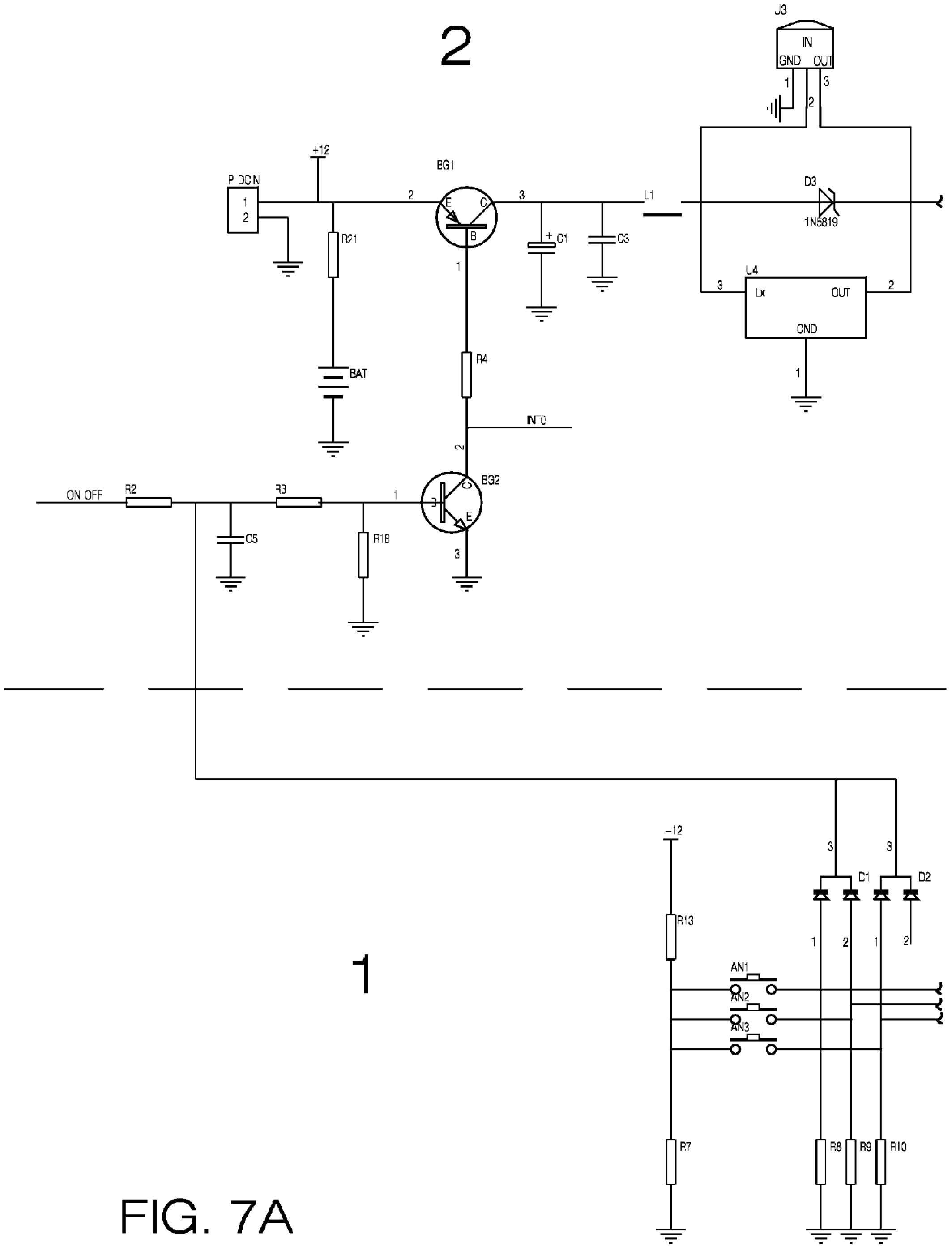
FIG. 7*a* is an exploded view of the left portion of FIG. 7.
Figures 1, 7A:
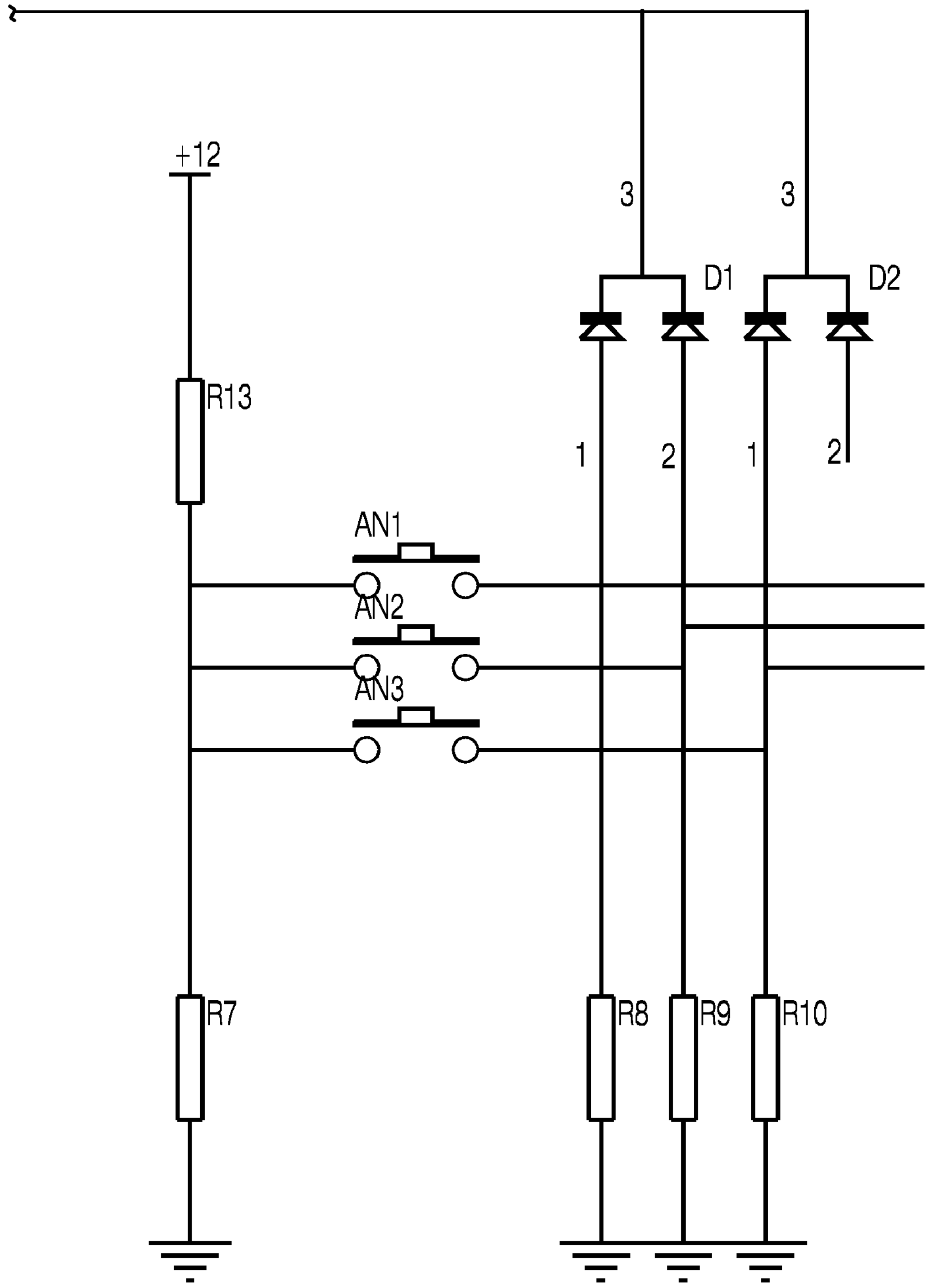
Figures 2, 7A:
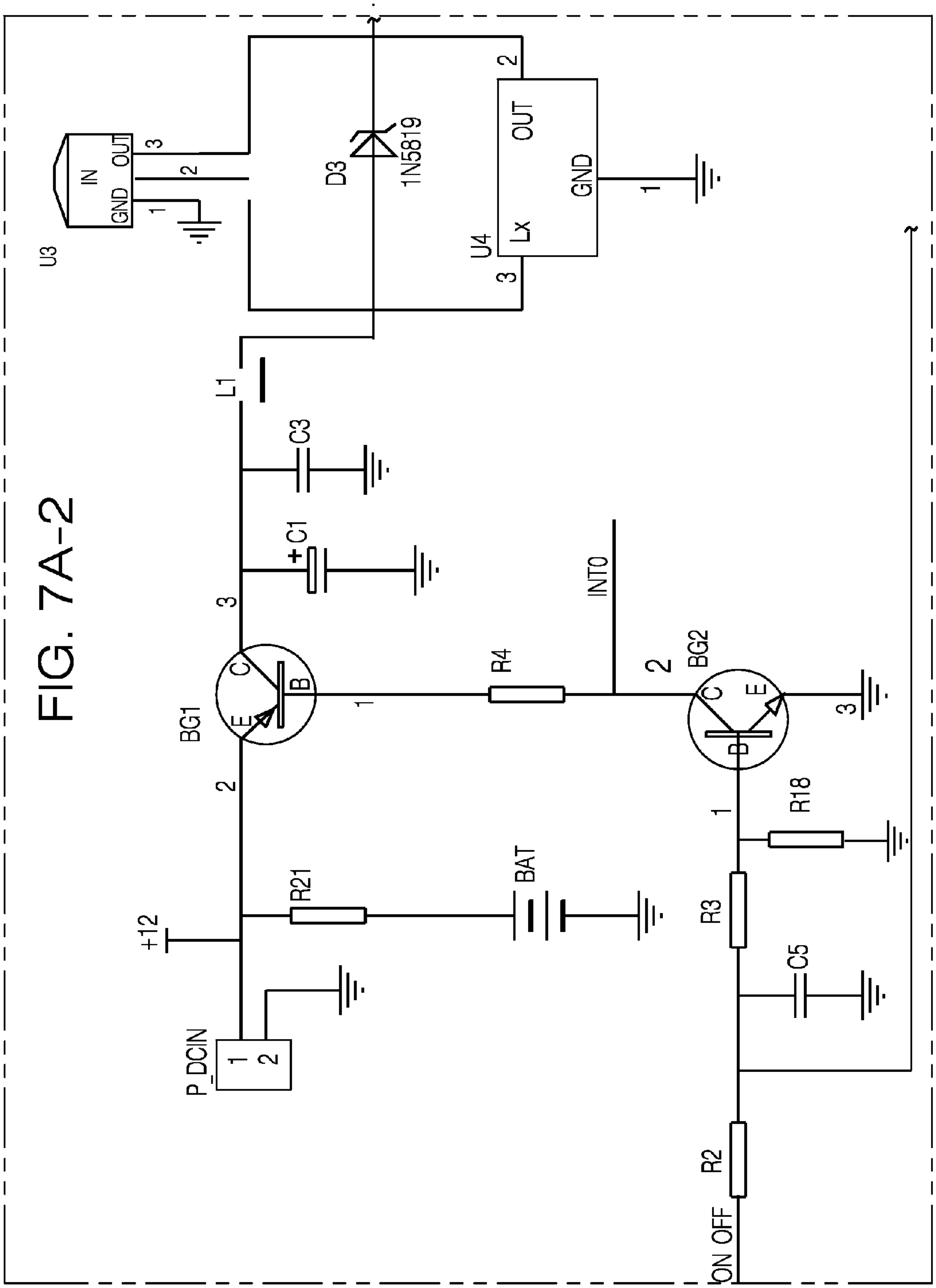
Figure 7B:
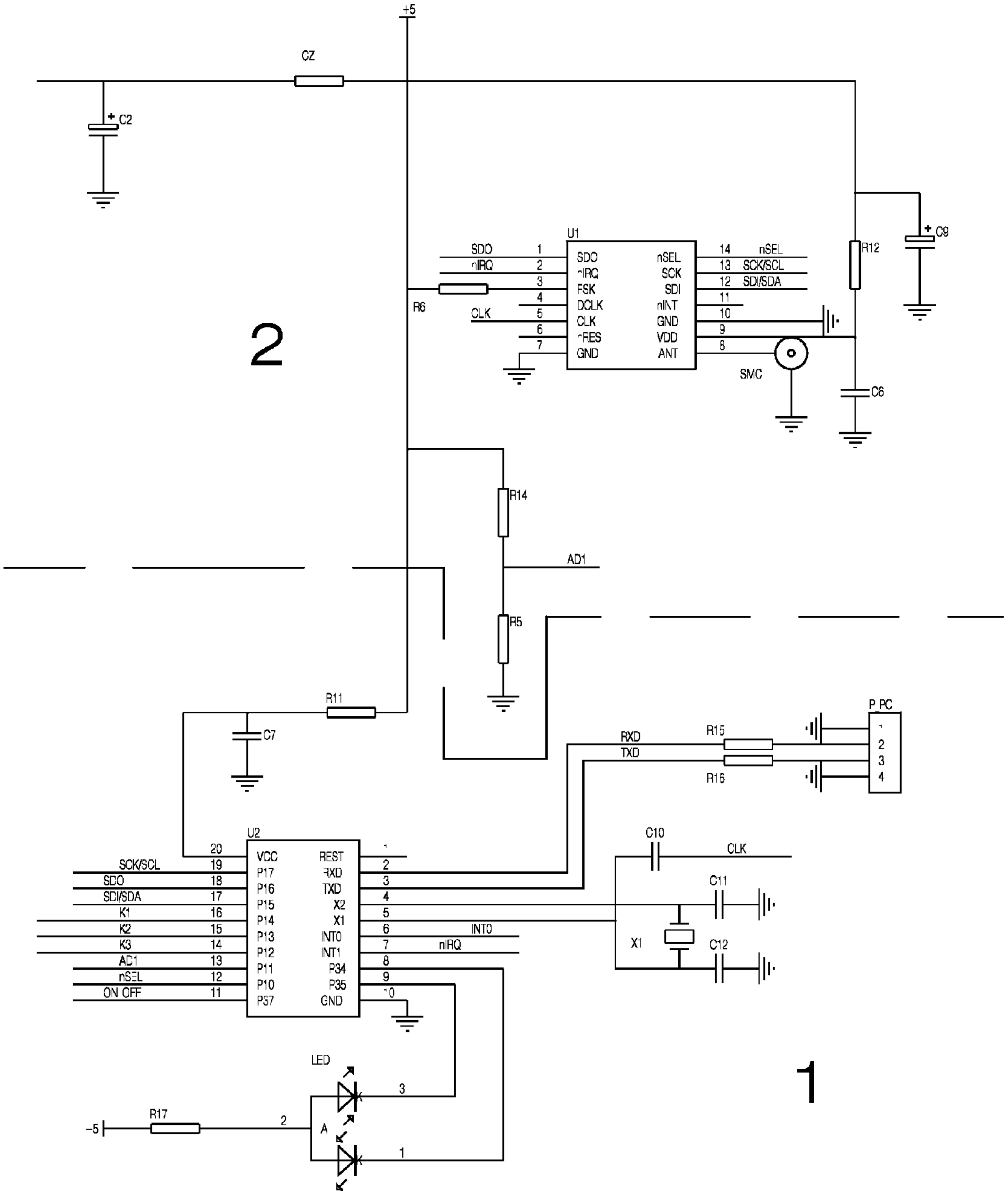
FIG. 7*b* is an exploded view of the right portion of FIG. 7.
Figures 1, 7B:
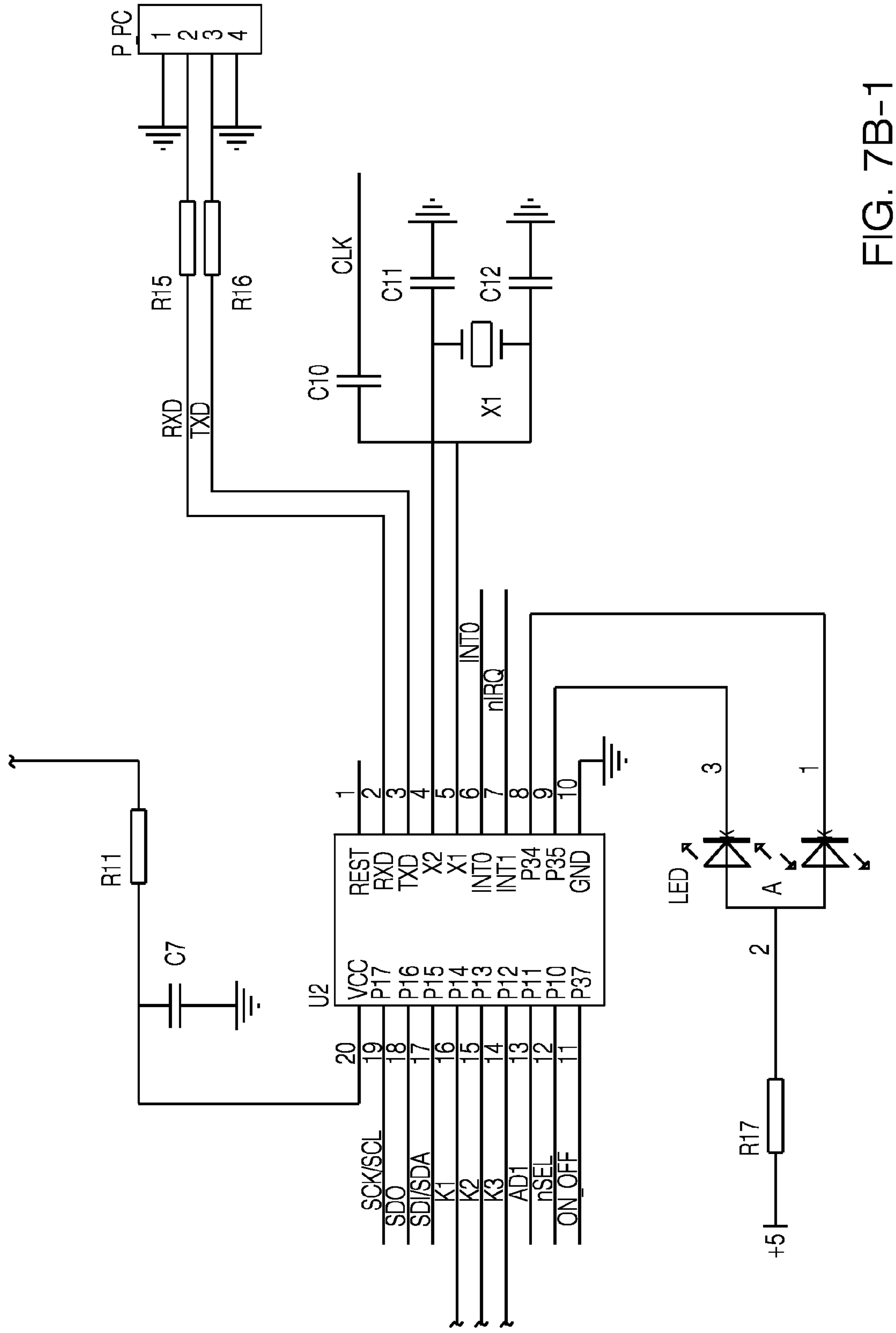
Figures 2, 7B:
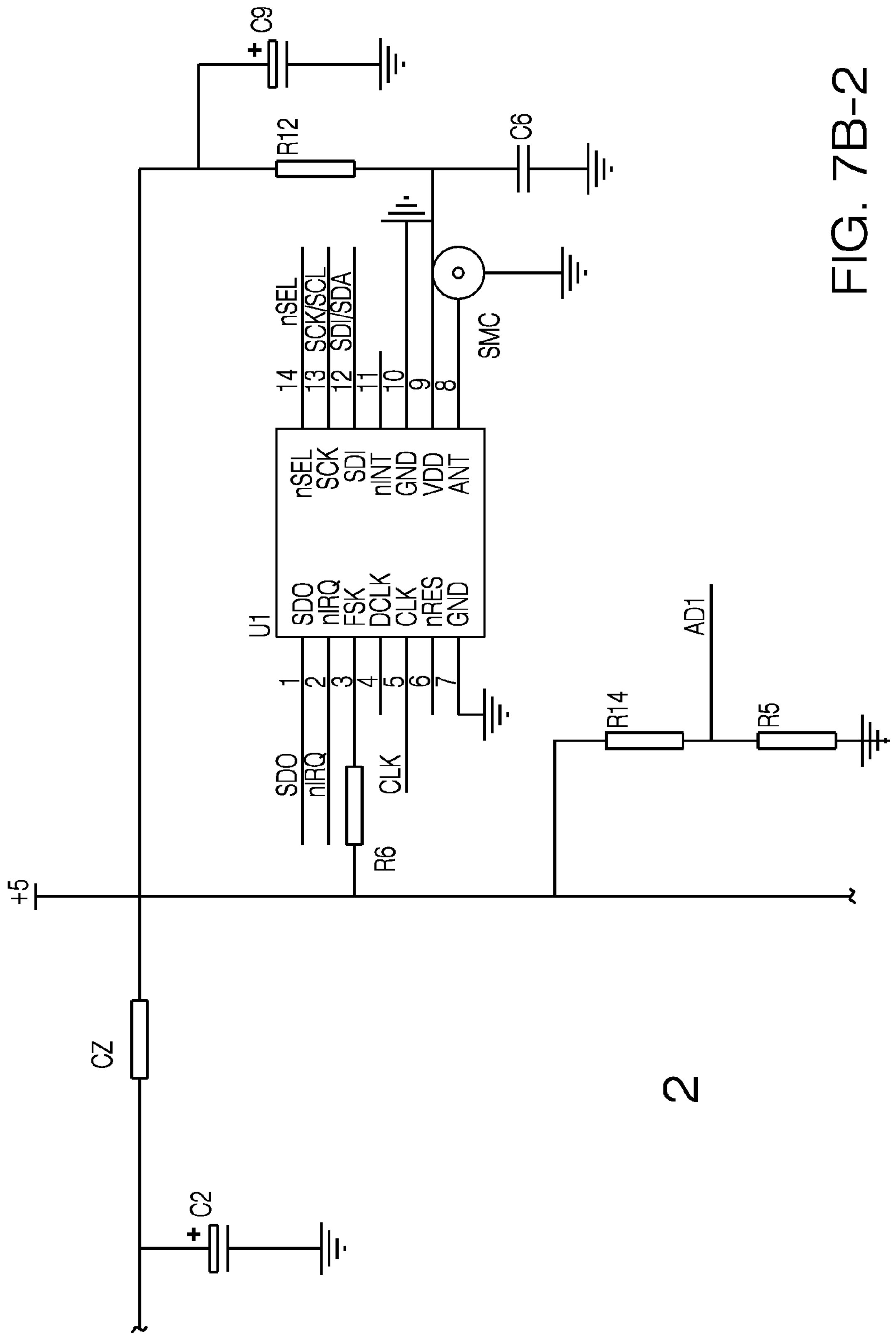

The following is a listing of numbers corresponding to a particular element referred to herein:

100 battery system
110 housing
111 first side of housing
112 second side of housing
113 third side of housing
114 fourth side of housing
115 top surface of housing
116 bottom surface of housing
120 window
130 window shade
140 support
150 motor housing
160 motor
210 photovoltaic panel
220 antenna
230 output cord
250 circuit board
320 remote control
330 battery compartment of remote control Referring now to FIGS. 1-4, the present invention features a battery system 100. In some embodiments, the battery system 100 of the present invention may be used with a motorized window shade 130. For example, the battery system 100 of the present invention can provide a self-contained power supply and a wireless remote control 320 for controlling the window shade 130. The battery system 100 of the present invention is not limited to use with a window shade 130. For example, in some embodiments, the battery system 100 may be used to power lights.

The battery system 100 of the present invention comprises a housing 110 having a first side 111, a second side 112, a third side 113, a fourth side 114, a top surface 115, and a bottom surface 116. In some embodiments, the housing 110 can be mounted on a side of a window 120.

Disposed inside the housing 110 is a plurality of batteries (e.g., eight AA batteries). Inside the housing 110 is a circuit board 250. The circuit board 250 is electrically/operatively connected to the batteries.

The battery system 100 of the present invention further comprises a photovoltaic panel 210. In some embodiments, the photovoltaic panel 210 is disposed on the first side 111, the second side 112, the third side 113, or the fourth side 114 of the housing 110. In an alternative embodiment, the photovoltaic panel 210 may be an external unit connected to the battery system 100 through a wire. The photovoltaic panel 210 is electrically/operatively connected to the circuit board 250 and the batteries. The photovoltaic panel 210 allows the batteries to be recharged.

The housing comprises an outlet cord 230 for allowing the housing to be electrically/operatively connected to a motor 160. In some embodiments, a window shade 130 is attached to a window via a support 140. In some embodiments, a motor 160 can control the window shade 130, for example allowing the window shade 130 to move up or down. In an alternative embodiment, a servo could be used in place of the motor.

Disposed inside the housing 110 is a receiver/antenna 220. The receiver/antenna 220 can receive a signal from a remote control 320. This receiver can operate using either wireless radio based signal, or an infrared signal. This is chosen by the designer. When the receiver/antenna 220 receives the signal, the circuit board 250 can cause the motor 160 to move the window shade 130 up or down. Such remote control mechanisms are well known to one of ordinary skill in the art.

The electronic charging circuit 250 is responsible for controlling the battery charging, as well as for controlling the operation of external devices, such as the window shade motor 160. This electronic system consists of a chipset to regulate the voltage and current from a photovoltaic panel 210. This chipset will provide enough power to power the control circuits. Any excess power will be used to charge the batteries. The control circuit consists of a microcontroller that is used for controlling an external device (eg. motor control). The microcontroller is also responsible for interpreting the commands received from a wireless receiver. This wireless receiver is used to receive wireless signals from the remote board. Finally, there is an on board timer used for waking up the microcontroller.

When the electronic circuit 250 is not controlling the motor 160 or being used to control the battery charge, it can enter a low power state to conserve power. In this low power state, many of the circuit elements are powered down. In some embodiments, the battery system of the present invention consumes about 30 microamperes when it is in the power saving mode.

A timer is used to periodically wake up the microcontroller to accomplish routine tasks, such as watching for a signal from the remote. In some embodiments, the timer will resume operation of the microcontroller once a second to check for a wireless signal before entering the suspend state again. To ensure that every received signal is processed by the microcontroller, the periodic resume operation from the timer is less than the minimum transmit time of the remote.

The remote circuit board features several buttons that are each wired to the microcontroller. The microcontroller is used for processing button presses. It will then generate the codes that correspond to the buttons that were pressed. These codes are then sent to the wireless radio for amplification and eventual transmission by the antenna. The minimum transmit time for the first transmission in a sequence has to be at least as long as the cycle time of the microcontroller in the main battery system 100.

The protocol used for communication between the wireless remote and the primary battery system, is dependent upon the particular configuration. In a minimal form, a simple pulse, or the presence of any signal could start the device. As more controls are added or if multiple devices are used in close proximity, a more complex protocol may be used. In a minimal form, each transmission would be required to begin with a resume code. Following this would be unique device ID, and the requested code describing the function. In some embodiments, the protocol would be as follows. In some embodiments, a signal that is received with errors would be ignored. In alternative embodiments, the message structure itself could be error resistant through careful choice of codes, or it could include commonly used error correcting algorithms, such as parity, redundancy, checksum values, and hash functions.

The following the disclosures of the following U.S. patents are incorporated in their entirety by reference herein: U.S. Pat. No. 4,009,051; U.S. Pat. No. 4,636,579; U.S. Pat. No. 5,372,173; U.S. Pat. No. 6,812,662; U.S. Pat. No. 7,081,724; U.S. Pat. No. 6,114,830; U.S. Pat. Application No. 2004/0154757; U.S. Pat. Application No. 2007/0278989.

EXAMPLE 1

The present invention features a battery system for saving power. In some embodiments, the battery system comprises a main control unit for processing commands. The main control unit may comprise a wireless transceiver for sending and receiving wireless commands, and a timer for waking a microcontroller from a low power state to check a status of the received signal. In some embodiments, the microcontroller configured to receive a signal from the wireless transceiver; and to generate a signal to the wireless transceiver. In some embodiments, the battery system further comprises a remote module for sending commands to the main control unit. The remote module may comprises a wireless transceiver for sending and receiving wireless commands, and a microcontroller for processing user inputs and sending the commands. In some embodiments, the microcontroller is configured to receive a signal from the wireless transceiver; and to generate a signal to the wireless transceiver.

As an example, Device U1 is a wireless transceiver. This is used to send and receive the wireless transmissions to the remote module. Device U2 is the microcontroller. It receives the signal from U1, and can be woken up by a timer (U3). Its main job is to control the output DC power. The input DC power is labeled P_DCIN, the output power is labeled P_DCOUT. There are a few transistors in between for controlling the switching, but in the end, they are using device JIQ1, 2 to control the output. In some embodiments, these are 2 12 volt relays. A relay is basically an electronically controlled switch. U4 is a voltage regulator. This is used to generate the 5V needed to power the chips. The remote module may be simpler. In some embodiments, there are only 2 chips. U1 is the wireless transceiver and U2 is the microcontroller. In some embodiments, there are 3 buttons used as inputs to the microcontroller. These can provide for various functions. It is powered by a battery.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A battery system for saving power, the battery system comprising:

(a) a main control comprising the following components: a central processing unit, a control unit, a timer and a receiver, the components are powered by a power source, wherein the timer is operatively connected to the receiver, the timer alternatively turns the receiver to an awake mode for a first time interval and to an sleep mode for a second time interval, wherein during the awake mode, the receiver is configured to receive a first signal, a second signal or a third signal; and during the sleep mode, the receiver does not receive the first, the second or the third signal;

wherein upon receiving the first signal, second signal or third signal the receiver operatively communicate that signal to central processing unit;

wherein upon receiving the first signal, second signal or third signal from the receiver, the central processing unit operatively communicates with the control unit, the control unit is operatively connected to a motor to activate the motor, wherein upon receiving the first signal the control unit instructs the motor to rotate clock-wise, upon receiving the second signal the control unit instructs the motor to rotate counter-clock-wise, upon receiving the third signal the control unit instructs the motor to stop rotating;

(b) a power source operatively connected to the components of the main control;

(c) a remote control comprising a transmitter, the transmitter is configured to transmit the first signal, the second signal or the third signal upon command.

2. The battery system of claim 1 wherein the awake mode of the first time interval has a duration of about ten millisecond and the sleep mode of the second time interval has a duration of about four seconds.

3. The battery system of claim 1 wherein the awake mode of the first time interval has a duration of about five to fifty millisecond.

4. The battery system of claim 1 wherein the sleep mode of the second time interval has a duration of about one to ten seconds.

* * * * *